June 14, 1949. W. H. TOBENER, JR., ET AL 2,473,483
MOLD FOR LINING BEARINGS
Filed Sept. 12, 1946 3 Sheets-Sheet 1
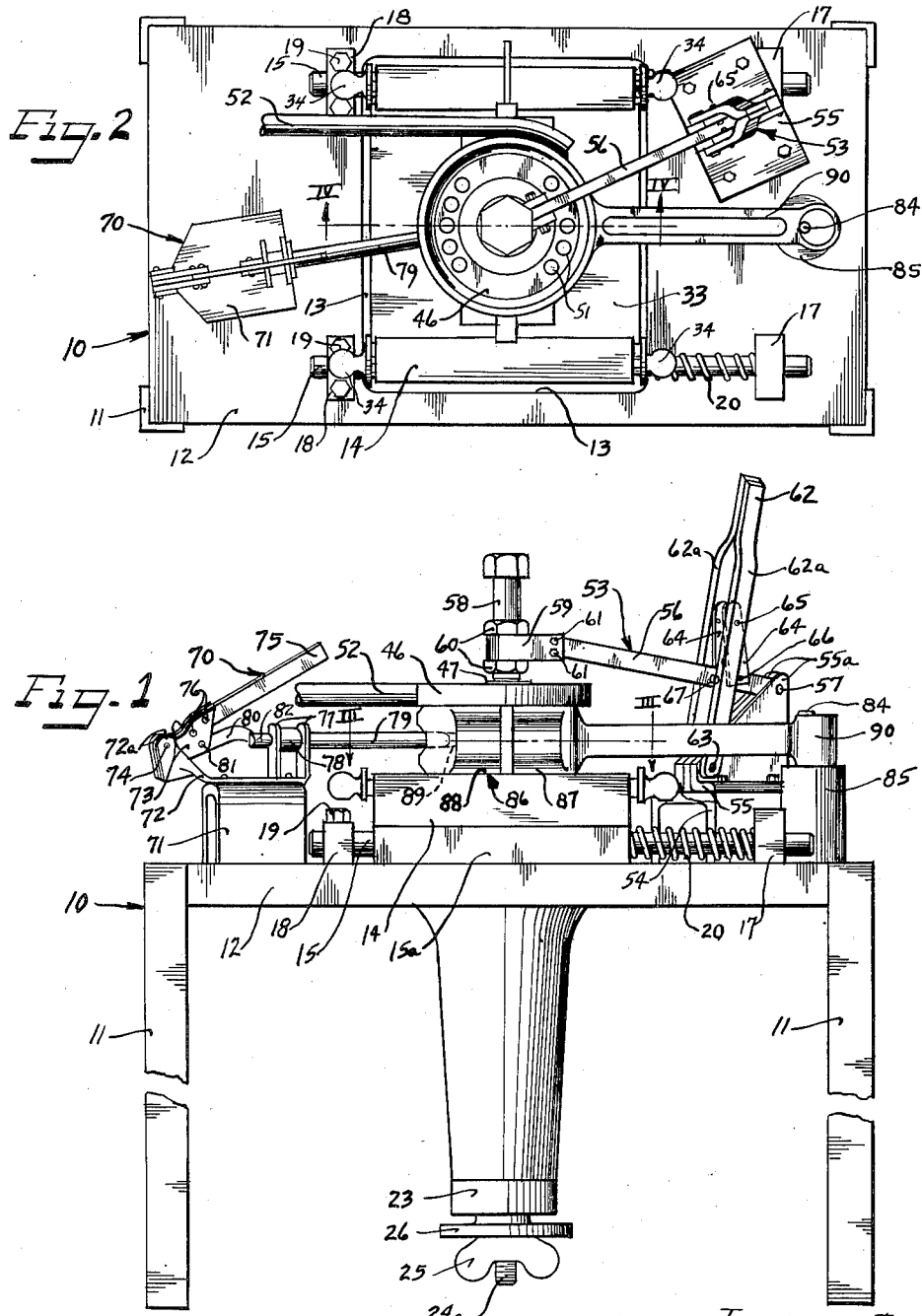
Inventors
WILLIAM HENRY TOBENER, JR.
CARL V. ANDERSON
by Attys.

June 14, 1949.  W. H. TOBENER, JR., ET AL  2,473,483
MOLD FOR LINING BEARINGS
Filed Sept. 12, 1946  3 Sheets-Sheet 2
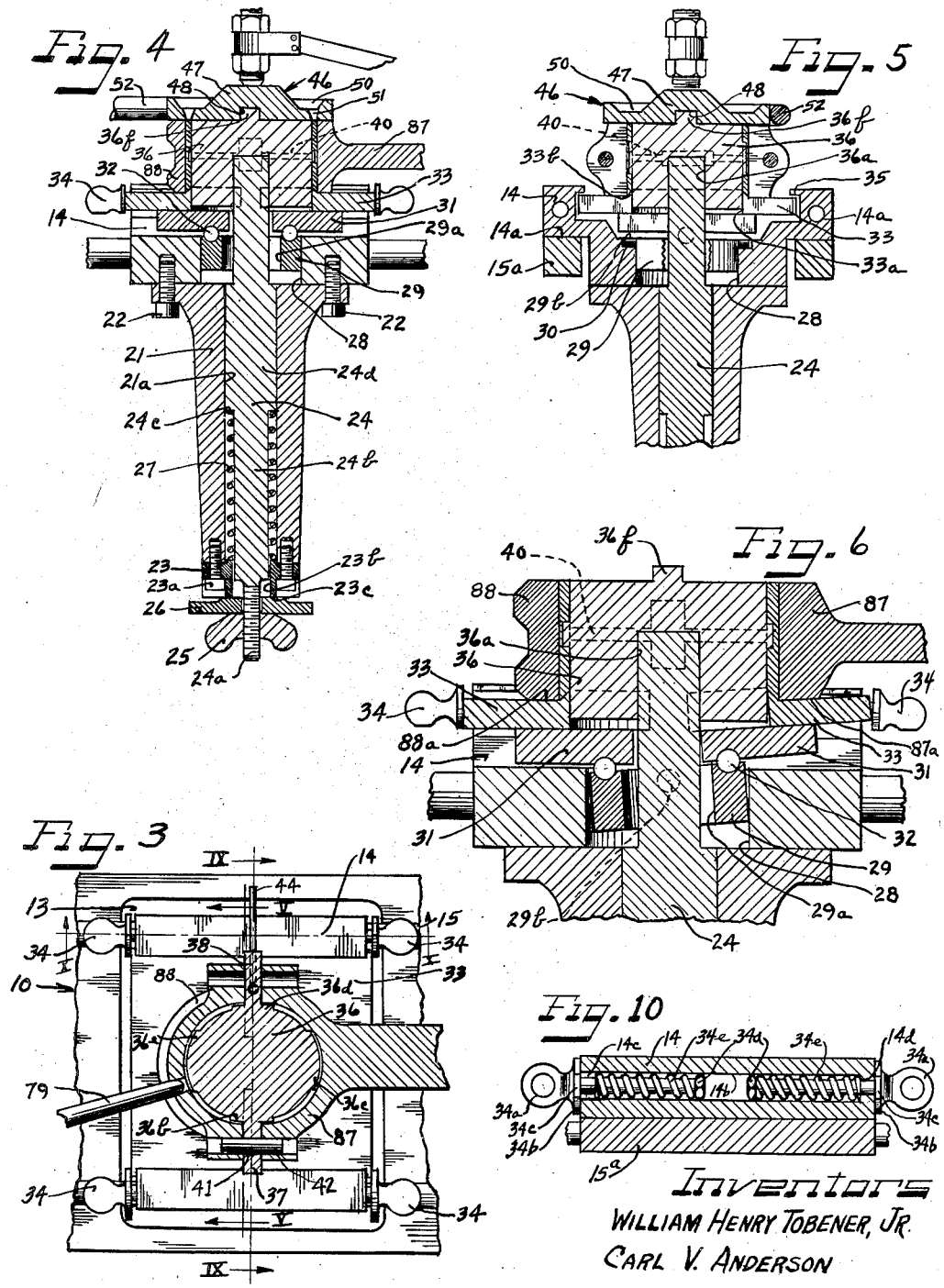
Inventors
WILLIAM HENRY TOBENER, JR.
CARL V. ANDERSON

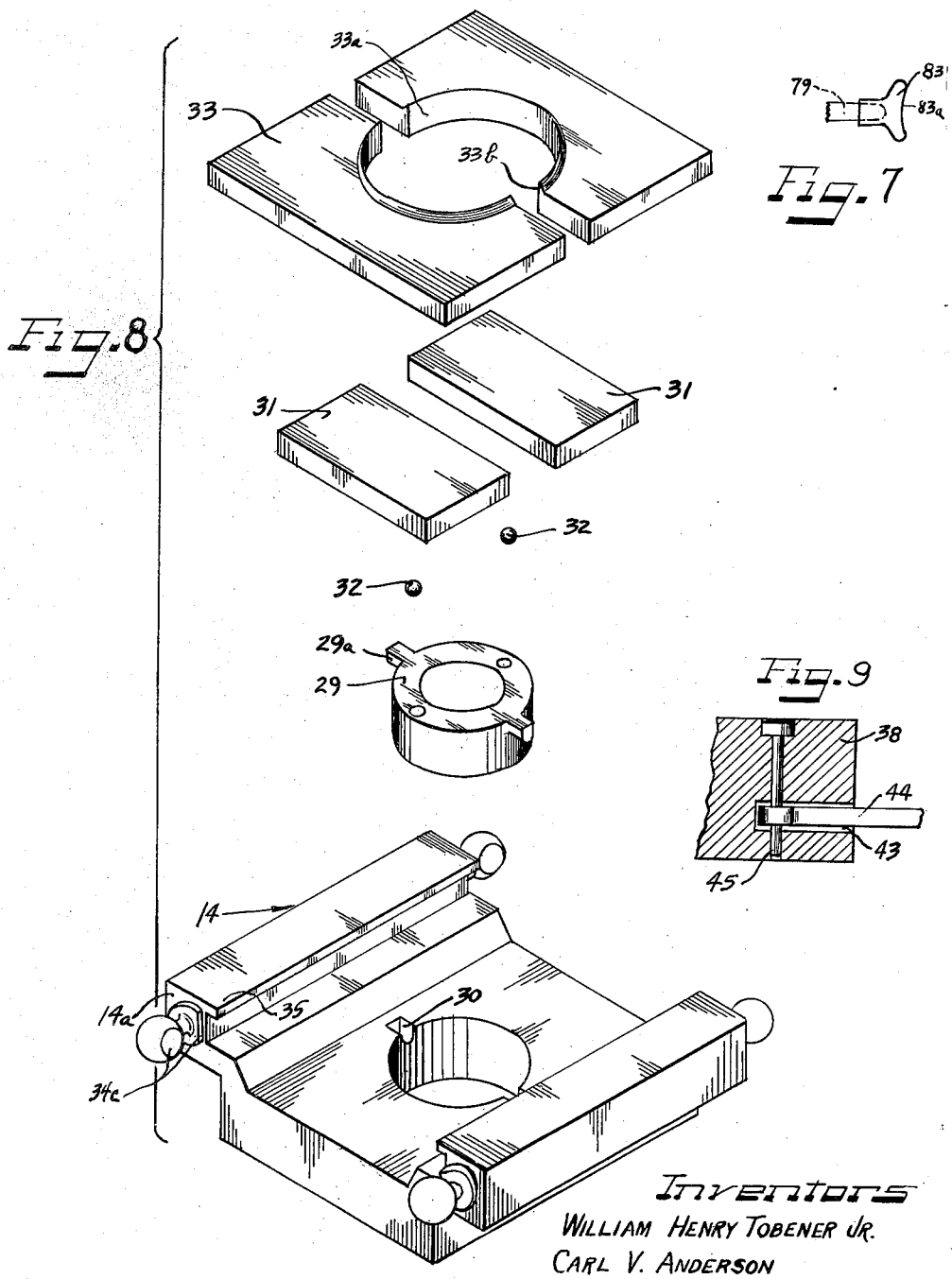

Patented June 14, 1949

2,473,483

UNITED STATES PATENT OFFICE 2,473,483

MOLD FOR LINING BEARINGS

William Henry Tobener, Jr., Cleveland, Ohio, and Carl V. Anderson, Portland, Oreg., assignors to Thompson Products, Inc., Cleveland, Ohio, a corporation of Ohio Application September 12, 1946, Serial No. 696,474

14 Claims. (Cl. 22—123)

This invention relates to casting machine and more particularly to a universal casting machine for babbitting all types and sizes of connecting rod bearings for internal combustion engines.

While the machines of this invention are generally useful for die casting, and especially for lining hollow articles with metal, they are especially useful in connection with the rebabbitting of both rod shell half and the head shell half of connecting rods for internal combustion engines, and will hereinafter be specifically described for such usage. It should be understood, however, that the invention is not limited to the use of the machine for rebabbitting connecting rods.

Heretofore, in lining connecting rod bearings by means of a casting machine in which the bearing is cast between the outer wall of a centrally disposed mandrel and the inner walls of the bearings shells which are placed in spaced relation around the mandrel, it has been the practice to use a machine especially designed to carry only one side mandrel adapted for lining one particular size bearing. Due to the numerous makes and models of engines, practically all of which use a different connecting rod bearing, it is highly desirable that a casting machine of this general type be capable of accommodating more than one size of bearing.

Also, in heretofore known casting machines of this type no provision was made for preventing the molten metal from escaping between the lower die plate and the bearing in cases where the connecting rod had become so worn away that it did not seat flush on the die plate. Escape of Babbitt metal in this manner makes the operation very difficult and costly.

It is, therefore, an object of this invention to provide a casting machine which may be economically adapted for lining bearings of different sizes.

It is another object of this invention to provide a casting machine which will effectively seal unevenly worn bearing shells on the die plate and thus prevent the escape of Babbitt metal through imperfect contact at this joint.

It is a further object of this invention to provide a novel means of loosening the bearings from the mandrel after the casting operation is complete.

It is a still further object of this invention to provide means for aligning the separated bearing shells in an axial direction about the mandrel in order to insure correct alignment of the oil grooves in the cast bearing lining.

According to the general features of this invention there is provided a bedplate slidably mounted on a support structure. This bedplate is adapted to hold various die plates all of which have the same overall dimensions but each of which is adapted to receive a different sized mandrel. The mandrel is detachably supported on the upper end of a spring pressed rod which extends upwardly through a central aperture in the bedplate. With this arrangement the casting machine may be quickly adapted for lining different size bearing shells simply by inserting suitable die plates and mandrels.

Another feature of this invention is the provision of a tilting collar pivotally mounted on the bedplate. This tilting collar, in conjunction with plates which are pivoted on the collar, urges the die plates into sealing contact with the end walls of the bearing shells no matter at what angle the shell has been worn away.

A further object of this invention is the provision of a lever pivoted in a recess in the laterally extended arms of the mandrel against which the bearing shells are held during the casting operation. After the lining has been cast in the bearing this lever is swung from side to side thus jarring the bearing halves loose from the mandrel.

A still further feature of this invention is the provision of a pin adapted to fit through the bolt holes in the connecting rod bearing shells and through a hole in the laterally extending arm of the mandrel, thereby aligning the bearing halves in a horizontal direction even though one half of the bearing may be worn away on its face much more than the other half.

Other and further objects of this invention will be apparent to those skilled in the art from the following detailed description of the annexed sheets of drawings which by way of a preferred example only, illustrate one embodiment of the invention.

On the drawings:

Figure 1 is a broken side elevation of the casting machine of this invention illustrating the manner in which a connecting rod is mounted on the machine for the casting operation.

Figure 2 is a plan view of the machine of Figure 1.

Figure 3 is a fragmentary sectional view taken substantially on the line III—III of Figure 1.

Figure 4 is a fragmentary vertical sectional view taken substantially on line IV—IV of Figure 2.

Figure 5 is a fragmentary vertical sectional view taken substantially on line V—V of Figure 3.

Figure 6 is an enlarged fragmentary sectional view of the upper portion of Figure 4 showing the die plate pressed into engagement with the uneven side of a worn connecting rod bearing.

Figure 7 is a side elevation of an alternate form of head for the horizontally acting clamping means of this invention.

Figure 8 is an exploded isometric view of the self-adjusting die plate assembly.

Figure 9 is a fragmentary sectional view taken on a line IX—IX of Figure 3.

Figure 10 is a fragmentary sectional view taken on line X—X of Figure 3.

As shown on the drawings:

The machines of this invention comprise a table or supporting frame 10, shown in Figures 1 and 2, having upstanding supporting legs 11 and a flat horizontal top 12. An opening 13 extending through the table top is provided near the center thereof.

For supporting the operating parts of this casting machine, a bedplate 14 is slidably mounted on the table top 12 by means of rods 15 having square cross section central member 15a secured, as by welding, to the underside of the ledges 14a of the bedplate 14 (Figure 5). The rods 15 are disposed for sliding movement in pillow blocks 17 which are permanently welded to the table top 12 and pillow blocks 18 which are detachably fastened on the table top 12 by cap-screws 19. A coil spring 20 is disposed around each guide rod 15 with one end abutting the pillow block 17 and the other end abutting a square central portion 15a of the rod 15. By its action against the portion 15a, the spring 20 tends at all times to urge the bedplate 14 and the guide rod 15 to the left.

Depending from the bedplate 14 and secured thereby by cap-screws 22 is a substantially cylindrical housing 21 which has a central opening 21a. A collar 23 is fastened by cap-screws 23a to the bottom surface of housing 21. This collar also has a central opening 23b in line with the opening 21a of the housing 21. A support rod 24 is positioned in the openings 21a and 23b and is adjustably held by a wing nut 25. This wing nut is screwed onto a downwardly threaded member 24a of the support rod 24. A collar 26, disposed about the threaded member 24a, is held against a shoulder 23c of the collar 23 by the wing nut 25. Thus, the support rod 24 may be adjusted upwardly or downwardly by the wing nut 25.

A coil spring 27 is disposed about a reduced central cylinder portion 24b of the support rod 24, abutting at its upper end on a shoulder 24c of the rod 24 and at its lower end on the upper surface of the collar 23. This spring 27 tends to resist downward movement of the support rod 24.

The upper cylinder portion 24d of the support rod 24 extends through an opening 28 of the bedplate 14 and through an opening 29a in a tilting collar 29. The collar 29 is pivotally supported by the bedplate 14 on pivot arms 29b (Figure 5) which are positioned in pivot sockets 30 of the bedplate 14.

A pair of rectangular shaped tilting plates 31 (Figure 8), one of which is positioned on either side of the support rod 24, is positioned for pivotal movement on two ball bearings 32 which are seated diametrically on the collar 29. A die plate 33 rests on the top surface of each tilting plate 31. Each die plate has a semicircular opening 33a which is adapted to fit around a mandrel 36.

On the upper surface of the die plate 33 a ridge 33b is provided around semicircular opening 33a. This ridge has an outer sloping side inclined at approximately a 45 degree angle to the top surface of the die plate 33. The inner side of the ring 33b is vertical and conforms to the inner wall of the opening 33a. This ridge causes a beveled edge to be cast on the bearing, as will be described hereinafter.

During the pouring operation the die plates 33 must be held in position around the mandrel 36. For this purpose there is provided, on both sides of the bed plate 14, a spring-pressed knob assembly 34. As illustrated in Figure 10, the knob assembly 34 comprises a knob 34a which has a shoulder portion 34b. One side of both the knob and the shoulder is cut off to provide a flattened surface 34c. The shoulder 34b is held against the bedplate 14 by the action of a spring 34e disposed in a passage 14b of the bedplate 14, about a bolt 34d, having one end abutting the head of the bolt 34d and the other end abutting a shoulder 14d of the bedplate 14. Since the bolt 34d is screwed into the knob 34a, the action of the spring tends to hold the knob against the bedplate 14. The flattened surfaces 34c of the knob 34a and the shoulder 34b permit the die plates 33 to be inserted in the bedplate 14 under the overhanging ledge 35 (Figure 8).

Referring to Figure 10, it will be seen that a knob assembly 34 is disposed at each end of the passage 14b. These assemblies are identical. However, the spring 34e of the left-hand assembly abuts at one end against a bushing 14c, not against a shoulder similar to shoulder 14d. This arrangement is chiefly for convenience and economy in assembling the unit, permitting the right-hand knob assembly to be positioned first in the passage 14b and then the left hand assembly, after which the bushing is suitably secured in place as by a press fit.

After the die plate 33 has been slid by the flattened sides 34c of the knob 34a and the shoulder 34b into the passageway formed in the bedplate 14 by the overhanging ledge 35 (Figure 8), the knob assembly 34 is pulled out, against the resistance of the spring 34e, far enough so that it is on the outer side of the die plate and then it is revolved clockwise 90° and released. The spring will pull the overlapping edge of the shoulder against the die plate 33 and thus will exert a force on the die plate tending to hold it in position against the mandrel 46, as shown in Figure 4. A knob assembly 34 is provided for both sides of each die plate, thus assuring a uniform positioning of the die plates.

As best seen in Figure 3, the mandrel 36 consists in plan view substantially of two semicircles connected by a rectangle. The rectangle extends out to either side and provides abutment shoulders or plates 37 and 38 against which opposed segments of the work to be lined are forced.

An opening 36a in the lower surface of the mandrel 36 is positioned over the upper end of the rod 24 and the mandrel is supported thereby.

Laterally projecting portions 36b, 36c, 36d, and 36e, are ridges formed on the outer surface of the mandrel 36, disposed to form oil grooves 40 on the inner surface of the cast bearing lining as indicated in Figure 4 and Figure 5.

Projecting upwardly from the top surface of the mandrel 36 is a centrally disposed member 36f.

A hole 41 is provided in the abutment shoulder 37 into which a pin 42 is permanently positioned as by a press fit. When the bearing shells are disposed about the mandrel 36 abutting the shoulder 37 and 38, the connecting rod holes in the bearing shells are positioned over the pin 42 in a horizontal direction thus insuring the alignment of the oil grooves to be cast in bearings. Thus, even though the side of one bearing shell is worn down more than the corresponding side of the other shell, the shells will still be held in correct horizontal alignment. While only one pin 42 and one hole 41 is shown in the drawings, it is within the scope of this invention to provide a similar pin adapted for insertion in the connecting rod bolt holes in the other side of the bearing shells and in a suitable hole in the abutment shoulder 38.

As shown in Figure 9 a slot 43 is cut through the abutment shoulder 38 and a lever 44 is pivotally connected therein by a pin 45 suitably disposed in the shoulder 38. As may be readily seen in Figure 3, after the bearing has been cast and the clamps, to be described later, have been released, the adherence of the bearing lining to the mandrel may be broken by swinging the lever 44 from side to side thus jolting the bearings loose.

For the purpose of directing the molten metal into the space to be filled, a pour plate 46 is removably mounted on top of the mandrel 36. This pour plate 46 has a hollow central boss portion 47 providing an open-bottomed recess 48 for receiving the upwardly extending cylindrical member 36f of the mandrel 36. This member 36f centers the pour plate 46 on the mandrel. An annular trough 50 is provided in the top face of the pour plate 46 around the boss 47 thereof to form a molten metal receiving chamber. A plurality of apertures 51 are formed at spaced intervals through the pour plate 46.

A handle 52 is welded to the pour plate 46 to facilitate its positioning and removing.

As shown in Figures 1 and 2 a toggle clamp device 53 is mounted on the table top 12 to act downwardly on the pour plate 46 for clamping the bearing shells between the pour plate 46 and the die plate 33 against the action of spring 27 in the event the mandrel 36 projects above the work.

As illustrated in Figure 1 the clamp 53 comprises a supporting platform 54 securely mounted as by welding to the table top 12. Opposed angle brackets 55 are bolted or riveted to the supporting platform and have upstanding spaced opposed flanges 55a receiving the end of a clamping bar 56 therebetween. A pivot pin 57 extends through the flanges 55a and through the rear end of the bar 56 to pivotally connect the bar to the flanges. The forward end of the clamp 53 comprises a work-engaging bolt 58 held in place relative to a collar 59 by two nuts 60. This arrangement permits the position of the bolt 58 to be adjusted with respect to the pour plate 46. The collar 59 is rigidly secured in angular relation to the bar 56 by bolts 61. A handle 62 having bifurcated opposed portions 62a straddling the flanges 55a is pivoted to the flanges by means of pins 63. A pair of links 64 project between the bifurcated portions 62a of the handle and are pivoted to the flanges by means of pins 65. The other ends of the links straddle the clamping bar 56 and are pivoted thereto by means of a pin 66. A stop pin 67 extends transversely through the clamping bar 56 in spaced relation forwardly from the pivot pin 66.

To move the work-engaging bolt 58 against the boss 47 of the pour plate 46 the handle 62 is pushed forward until it strikes the stop pin 67, the pin 66 will then have slightly passed the dead center position which is reached when the pins 63, 66 and 65 are in line. When the dead center position is passed a force exerted upward on the bolt 58 will not open the clamp since there will be no component of force tending to rotate the handle 62 clockwise about its pivot 63. Thus the work is secured in place until released by applying a clockwise force to the top of handle 62.

The clamping device 70, as shown in Figures 1 and 2 comprises a supporting platform 71 securely mounted as by welding to the table top 12. A bracket 72 is bolted or riveted to the platform 71. The bracket 72 has a forked support member 72a which carries between its arms pivot plates 73, one plate being pivotally attached to each arm by a pin 74. A handle 75 is secured between pivot plates 73 by means of rivets 76. The bracket 72 also has two upright bearing support members 77 held in spaced relation to each other by a tubular member 78. A work-engaging push rod 79 is mounted for slidable movement in the bearing members 77 and the spacer tube 78. The push rod 79 is connected to the pivot plates 73 by means of a link 80. This link 80 is pivotally secured between the pivot plates 73 by a pin 81 and is pivotally fastened in a forked end of the push rod 79 by a pin 82.

As shown in Figure 1 the active end of push rod 79 is adapted to be positioned in a tapered oil hole in the bearing shell of the work piece. As illustrated in Figure 7, in cases where the bearing shells do not have suitably placed oil holes, an adapter 83 may be slid over arm 79. This adapter 83 has a curved contact surface 83a suitable for cooperation with the exterior surface of the bearing shell.

To move the push rod 79 into contact with the work the handle 75 is pushed forward until it comes to rest on the link 80. In this position the pin 81 has slightly passed the dead center position which is reached when the pins 74, 81 and 82 are in line. When the dead center position has been passed a force exerted to the left on the push rod 79 will not release the clamp because there will be no component of force tending to rotate the pivot plate 73, and consequently the handle 75, counterclockwise about the pivot pin 74. Thus the work is secured against lateral movement until the clamp 70 is released by a counterclockwise force being applied to the top of handle 75.

A stop pin 84 is mounted on a support block 85 which is secured as by welding to the table top 12 near one end thereof.

In operation of the machine of this invention a work piece, such as a conventional connecting rod 86 having a split main bearing portion composed of an upper half-bearing shell 87 integral with the rod portion of the connecting rod and a strap member or lower shell 88, is positioned on die plate 33 around the ridge 33a thereof with the base of each shell abutting the shoulders 37 and 38 of the mandrel 36 and the bolt holes of each piece positioned on the pin 42. As best seen in Figure 1, the pushrod 79 of the clamp 70 is positioned in a tapered oil hole 89 of the lower bearing shell 88 and the wrist pin bearing end 90 of the rod 86 is positioned around the stop pin 84. By pushing the handle 75 of the clamp 70 to the right, the whole bedplate and mandrel assembly is shifted bodily to the right against pressure of the springs 20 as the guide rods 15 slide in the pillow blocks 17 and 18. The clamp 70 is so adjusted that it will reach its over-dead-center locked position just as the wrist pin end 90 of the connecting rod 86 abuts against the stop pin 84. The work is now locked against any forces tending to cause lateral movement.

When the work has been shifted to the right and locked against the stop pin 84 the pour plate 46 is positioned on member 36f of mandrel 36 and the work engaging bolt 58 of the clamp 53 is brought down on the boss 47 of the pour plate 46 and the clamp 53 is put in its over-dead-center locked position by pivoting the handle 62 about the pin 63. Thus the work is locked in position between the pour plate 46 and the die plate 33.

When the work has been clamped in position, molten metal such as babbitt is poured into the trough 50 of the pour plate 46 and flows through the apertures 51 into the annular space between the mandrel wall and the inside surface of the piece to be lined. As soon as the metal has solidified the top clamp 53 is released and the pour plate 46 is given a slight twisting movement and removed. The clamp 70 is now released whereby the springs 20 move the bedplate and mandrel assembly bodily to the left. Pin 42 is then removed from the connecting rod bolt holes.

The lever 44, pivoted in the shoulder 38 of the mandrel 36, may now be swung from side to side against the base of the bearing shells thereby jolting them loose from the mandrel 36. It is necessary that the bearing shells be removed in a lateral direction since the ridges formed on the outer surface of the mandrel 36 for shaping oil grooves in the bearing prevent the mandrel from being withdrawn from the work in a vertical direction.

When the bearings have been released from the mandrel they may be removed from the machine.

Illustrated in Figure 6 is an important feature of this invention. As long as the upper shell 87 and the lower shell 88 are worn off the same amount on their sides the mandrel assembly will move directly downwardly when the clamp 53 is brought down on the pour plate 46 and the collar 29, the tilting plate 31 and the die plate 33 will move downwardly still maintaining their initial horizontal positioning. However, if one side of one shell is worn off more than the cooperating side of the other shell, a pivoting action of the above mentioned members will result.

For example if the surface 87a of the upper bearing shell 87 has been excessively worn away as indicated in Figure 6, it will not bear on the die plate immediately below it when the clamp 53 is brought down on the pour plate 46 due to the fact that the pin 42 (Figure 3) is holding both shells in horizontal alignment. However, the lower surface 88a of the bearing shell 88 will contact the die plate below it and will transmit a downward force through the associated tilting plate that will cause the left side of the collar 29 to pivot downwardly about the pivot arms 29b. The right side of the collar will be pivoted upwardly thus urging the tilting plate and the die plate immediately above upwardly until the die plate contacts the worn surface 87a. The upwardly moving tilting plate and die plate are free to pivot about the ball bearing 32 and to assume any inclination that may be required to form a tight seal against the lower surface.

It is to be noted in Figure 6 that since the knob assembly 34 is spring pressed it will move outwardly to permit this tilting action but will at the same time maintain pressure on the die plate 33.

If the lower surface 87a is worn away at any angle other than that indicated in Figure 6 the die plate and the tilting plate will adjust themselves accordingly. Also, if surface 87a is still horizontal but worn away to a greater extent than the surface 88a, the upwardly moving die plate and tilting plate will not pivot about ball bearing 32 at all, merely sealing the die plate against the horizontal surface 87a.

If surfaces 87a and 88a are both worn away unevenly, the die plates and tilting plates on both sides will pivot on ball bearings 32 and assume a sealing contact on these surfaces.

From the foregoing description it will be clear that this invention provides an easily operated and relatively inexpensive machine for simultaneously lining the sections of a multi-section bearing with a lining of uniform thickness containing oil grooves and pockets and chamfered bearing edges. Also this machine is adapted to use therein various sizes of mandrels and mandrels having various surfaces and ridges for defining different oil grooving. Further this casting machine is extremely economical to operate due to the novel pivotally mounted die plate which prevents loss of bearing metal.

It will be of course understood that various details of construction may be varied through a wide range without departing from the principles of this invention and it is therefore, not the purpose to limit the patent granted hereon otherwise than necessitated by the scope of the appended claims.

We claim as our invention:

1. In a casting machine, members mounted for limited universal pivoting movement, die plates positioned on said members for movement therewith, a mandrel mounted for slidable movement between said die plates, means for clamping work pieces about said mandrel in spaced relation therefrom, and a pour plate supported on said mandrel for directing molten metal into spaces between the work pieces and the mandrel.

2. In a casting machine, a support, a member pivoted on said support for tilting movement relative to the support, ball bearings seated on said member, support plates pivoted on said ball bearings, die plates slidably positioned on said support plates, a mandrel mounted for slidable movement between said die plates, a pour plate removably positioned on said mandrel, and means for holding work pieces in position around said mandrel.

3. In a casting machine, a support member, a collar pivotally mounted on said support member, plate members mounted on said collar for limited universal tilting, a spring-pressed support rod extending through said collar, a mandrel positioned on said support rod above said collar, die plates slidably positioned about said mandrel, a pour plate positioned on said mandrel, and means for clamping work pieces in position about said mandrel, said die plates and said mandrel being selectively removable from said machine.

4. In a casting machine, a support, members tiltably mounted on said support, die plates mounted for tilting with said member, a rod slidably mounted on said support and extending through the member and between the die plates, a mandrel removably mounted on said rod, a pour plate removably positioned on said mandrel, and means for clamping work pieces around said mandrel between said pour plate and said die plates whereby said die plates will tilt to follow the contour of the adjacent faces of the work pieces.

5. In a casting machine, a table having an apertured top, guide rods slidably mounted on said table top, a bed plate mounted on said guide rods, said bed plate having a centrally disposed aperture therein, a housing depending from said bed plate, a spring-pressed support rod adjustably mounted in said housing, a collar disposed about said support rod and pivoted on said bed plate, a pair of ball bearings diametrically disposed on said collar, a support plate pivoted on each of said ball bearings, a die plate positioned on each support plate in sliding relation thereto, said die plates each having a central semi-circular aperture and a beveled ridge around the upper edge of said aperture, a mandrel removably mounted on said support rod for sliding movement between said die plates, a pour plate removably positioned on said mandrel and means for holding both halves of a split bearing around said mandrel and firmly clamped between said pour plates and said die plate whereby said die plates will tilt to hug the adjacent faces of the bearing halves and will position the beveled ridges within the bearing.

6. In a casting machine, members mounted for limited universal pivoting movement, die plates positioned on said pivoting members for movement therewith, a mandrel mounted for slidable movement between said die plates, means for clamping work pieces about said mandrel, a pour plate positioned on said mandrel and a lever pivoted in said mandrel whereby said work pieces may be jarred loose from said mandrel after the casting operation.

7. In a casting machine for simultaneously lining the two sections of a bolt hole equipped connecting rod bearing without pinning the sections together with bolts in said bolt holes, a mandrel, die plates positioned about said mandrel, a pour plate mounted on said mandrel, said mandrel having ribs for projecting between the sections of the bearing, clamping means for locking the sections of the bearing against said ribs, a pin carried by one of said ribs and sized to fit in a bolt hole of each section of said bearing for realigning the sections of said bearing in a direction parallel to the face of the connecting rod.

8. A universal bearing lining machine for split bearings comprising an apertured bed plate, a rod slidable through the aperture of said bed plate, a mandrel detachably seated on said rod, said mandrel having liner defining faces and laterally extending ribs, opposed die plates independently tiltable and slidable on said bed plate and having inner recessed ends for receiving said mandrel and for engaging opposed faces of the ribs thereof, said die plates being arranged for respectively receiving thereon the bottom end face of a half portion of a split bearing, a pour plate seated on said mandrel for overlying the top end faces of the bearing halves, means for holding the bearing halves against the mandrel ribs, and means for urging the die plates and pour plates toward each other to clamp the bearing halves therebetween whereby the die plates will automatically tilt to follow the contour of the bottom end faces of the bearing halves.

9. A universal liner machine for babbitting all sizes of both halves of connecting rod bearings which comprises a table, a bed plate horizontally slidable on the table, a connecting rod anchor on the table, spring means urging the bed plate away from the anchor, a vertical rod slidably mounted on said bed plate, spring means urging said rod upwardly to a level above the bed plate, a mandrel removably seated on the upper end of the rod and having radially extending diametrically opposed ribs together with a cylindrical side wall selectively sized for forming the inner surfaces of the desired bearing liners in both halves of a connecting rod bearing, a pour plate removably seated on top of the mandrel to overly the top end face of the bearing halves and having pour holes to feed liner material around the mandrel, opposed removable die plates freely slidable and tiltable on the bed plate on opposite sides of the mandrel for receiving the bottom end faces of the bearing halves, a first clamp on the table forcing the pour plate toward the die plates against the action of the spring means on the rod to clamp the bearing halves therebetween and cause the die plates to tilt into sealed engagement with the bottom end faces of the bearing halves, and a second clamp on the table acting on a bearing half to urge the bed plate toward said anchor against the action of the spring means for sealingly engaging both halves of the bearing on the mandrel ribs whereby said spring means upon release of said clamps will release the lined bearing halves from the machine.

10. A universal metal lining machine for split work pieces which comprises a bed plate, a rod slidably mounted on said bed plate, a mandrel removably mounted on said rod for quick replacement, a pour plate removably mounted on said mandrel, opposed die plates on opposite sides of said mandrel freely tiltable on said bed plate and arranged for quick replacement, a first clamp for holding the split sections of an article to be lined around the mandrel and a second clamp for clamping said sections between the pour plate and die plates whereby said mandrel and said die plates are quickly replaceable on said machine to accommodate different sized articles and whereby said die plates will tilt into conformity with the articles.

11. In a machine for lining split articles, an article supporting mechanism comprising a mandrel adapted to receive the articles therearound and having ribs extending therefrom for projecting between the sections of the articles, means for clamping the sections of the articles tightly against said ribs, and a spreader rod pivotally mounted on one of said ribs for selective movement against one of the lined articles for jarring said articles loose from the mandrel.

12. In a casting machine for lining articles with metal or the like, support means for said articles comprising a pair of independent die plates for receiving thereon the article to be lined, a support for each plate accommodating universal movement of the plate, and a pivot mounting for said supports whereby said pivot mounting accommodates variations in level of the plates while said supports accommodate variation in angular relationship of the plates at any level to insure full seating of the article on both plates.

13. In a casting machine, a support, a member pivoted on said support for tilting movement relative to the support, ball bearings seated on said member, support plates pivoted on said ball bearings, die plates slidably positioned on said support plates, a mandrel mounted for slidable movement between said die plates, a pair of spring pressed knobs for urging each of said die plates against said mandrel, a pour plate removably positioned on said mandrel, and means for holding work pieces in position around said mandrel.

14. In a casting machine, a support member, a universal pivoting member disposed in said support member, die plates positioned on said pivoting member for movement therewith, a mandrel mounted for slidable movement between said die plates, means including a yieldably mounted clamp member on said support member for urging said die plates against said mandrel, means for clamping work pieces about said mandrel and a pour plate positioned on said mandrel for directing molten metal into spaces between the work pieces and the mandrel.

WILLIAM HENRY TOBENER, JR.
CARL V. ANDERSON.

REFERENCES CITED

The following references are of record in the file of this patent:

UNITED STATES PATENTS

| Number | Name | Date |
| --- | --- | --- |
| 1,207,128 | Bird | Dec. 5, 1916 |
| 1,380,380 | Hempy | June 7, 1921 |
| 1,748,688 | Webber | Feb. 25, 1930 |
| 1,912,606 | Watson | June 6, 1933 |
| 2,375,939 | Morris | May 15, 1945 |

FOREIGN PATENTS

| Number | Country | Date |
| --- | --- | --- |
| 693,984 | France | Sept. 8, 1930 |
| 242,701 | Germany | Jan. 17, 1912 |